(12) United States Patent
Takeichi

(10) Patent No.: US 8,797,587 B2
(45) Date of Patent: Aug. 5, 2014

(54) IMAGE PROCESSING DEVICE AND IMAGE RECORDING APPARATUS HAVING THE SAME

(75) Inventor: Kengo Takeichi, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 259 days.

(21) Appl. No.: 13/282,907

(22) Filed: Oct. 27, 2011

(65) Prior Publication Data

US 2012/0105913 A1 May 3, 2012

(30) Foreign Application Priority Data

Oct. 29, 2010 (JP) .................................. 2010-243745

(51) Int. Cl.
*G06K 15/00* (2006.01)
*G06F 3/12* (2006.01)
*H04N 1/00* (2006.01)

(52) U.S. Cl.
USPC ......... 358/1.16; 358/1.6; 358/1.13; 358/1.14; 358/1.15

(58) Field of Classification Search
USPC .................. 358/1.16, 1.6, 1.13, 1.14, 1.15
See application file for complete search history.

(56) References Cited

U.S. PATENT DOCUMENTS

| | | | | |
|---|---|---|---|---|
| 7,548,337 B2* | 6/2009 | Teranishi et al. | ............. | 358/1.16 |
| 7,583,402 B2* | 9/2009 | Teranishi et al. | ............. | 358/1.16 |
| 8,068,249 B2* | 11/2011 | Yokoyama et al. | .......... | 358/1.15 |
| 8,205,107 B2* | 6/2012 | Berke et al. | .................... | 713/340 |
| 8,213,026 B2* | 7/2012 | Sugiyama | ...................... | 358/1.1 |
| 8,514,096 B2* | 8/2013 | Ando | ........................ | 340/815.45 |
| 8,533,444 B2* | 9/2013 | Jun | ................................. | 713/2 |
| 2004/0044833 A1* | 3/2004 | Ryan | ................................. | 711/5 |
| 2007/0046331 A1* | 3/2007 | Kwon et al. | .................... | 326/83 |

FOREIGN PATENT DOCUMENTS

| | | |
|---|---|---|
| JP | 2003-276289 A | 9/2003 |
| JP | 2006-163708 A | 6/2006 |
| JP | 2008-186481 | 8/2008 |

OTHER PUBLICATIONS

Notification of Reasons for Rejection dated Dec. 18, 2012 received from the Japanese Patent Office from related Japanese Application No. 2010-243745, together with an English-language translation.

* cited by examiner

*Primary Examiner* — Firmin Backer
*Assistant Examiner* — Jonathan Beckley
(74) *Attorney, Agent, or Firm* — Scully, Scott, Murphy & Presser PC

(57) ABSTRACT

An image processing device is provided, which includes a first processor, a second processor configured to perform communication with the first processor, and a memory connector that is connected with the second processor, configured such that an external memory is detachably attached thereto, and provided with a terminal that is connected with the first processor and connectable with a memory area of the external memory which area stores specification information of the external memory. The first processor is configured to, prior to the second processor being booted, determine whether an error relating to the external memory is caused, via the terminal.

12 Claims, 4 Drawing Sheets

IMAGE PROCESSING DEVICE AND IMAGE RECORDING APPARATUS HAVING THE SAME

CROSS-REFERENCE TO RELATED APPLICATION

This application claims priority under 35 U.S.C. §119 from Japanese Patent Application No. 2010-243745 filed on Oct. 29, 2010. The entire subject matter of the application is incorporated herein by reference.

BACKGROUND

1. Technical Field

The following description relates to one or more techniques for an image processing device having a first processor and a second processor connected with a detachably attachable external memory and for an image recording apparatus having the image processing device and a print engine.

2. Related Art

So far, techniques for checking a memory connected with a CPU have been proposed. As a first example of the techniques, a memory management device has been known that includes a main CPU and a sub CPU connected with an on-board non-volatile rewritable memory. According to the memory management device, when the memory management device is powered on, the sub CPU checks whether an operating program stored on the on-board memory is normal. Further, when determining that the operating program stored on the on-board memory is not normal, the sub CPU forbids the operating program to be executed.

As a second example of the techniques, an image forming apparatus has been known that includes a CPU, an internal memory connected with the CPU, and an external memory connectable with the CPU. According to the image forming apparatus, the CPU detects whether the external memory is appropriately attached to the CPU, by cooperation with the internal memory. When determining that the external memory is appropriately attached thereto, the CPU accesses the SPD (Serial Presence Detect) of the external memory to detect whether there is an initial failure.

SUMMARY

Meanwhile, in recent years, an image recording apparatus such as a printer has been known, which includes a first processor configured to control the whole apparatus having a print engine and an operation panel, and a second processor configured to generate image data of an image to be formed on a sheet by the print engine. Further, there are various types of usage of the image recording apparatus depending on users. For example, the image recording apparatus may be used as a network printer by a lot of users. In this case, preferably, a memory to be used when the second processor generates the image data may be selectable by each user, depending on the number of the users and/or the capacity of handled data. To achieve this, the memory for the second processor is required to be not an on-board memory but a user-selectable external memory that is detachably attachable to a memory slot provided on a board.

However, in the image recording apparatus configured as above, when there is something wrong (a problem) with the external memory such as a problem that the external memory is inappropriately attached by a user, a problem that the external memory does not meet standards, and a problem that the external memory has an initial failure, the second processor does not use the external memory. In such a case, the second processor cannot normally function or inform the first processor of the problem with the external memory. Therefore, the first processor cannot inform the user of the problem with the external memory by displaying the problem on the operation panel. Thus, the user cannot use the image recording apparatus or determine which part of the apparatus is wrong (the external memory or any other part).

Further, in this situation, even though the aforementioned techniques for checking a memory connected with a CPU are applied, it is hard to resolve the above problem concerning the image recording apparatus. Specifically, in the first example, since the memory connected with the sub CPU is not a detachably attachable external memory but an on-board memory, it is not required in the first place to detect an external memory inappropriately attached or an external memory that does not meet standard. Further, in the first example, since the memory management device is configured under an assumption that the sub CPU is normally connected with the on-board memory, it is impossible to detect the state where the external memory is inappropriate attached.

Further, in the second example, the CPU can detect a problem with the external memory such as inappropriate attachment of the external memory, but the detection is achieved by cooperation between the CPU and the internal memory. Namely, since the CPU can function by cooperation with the internal memory even without any external memory connected with the CPU, the CPU can detect whether the external memory is appropriately attached to the CPU. To the contrary, in the aforementioned image recording apparatus, when there is a problem with the external memory such as inappropriate attachment of the external memory, the second processor, to which the external memory is to be connected, cannot normally function. Thus, it is impossible to detect any problem with the external memory.

Aspects of the present invention are advantageous to provide one or more improved techniques for an image processing device having a first processor and a second processor connected with a detachably attachable external memory and for an image recording apparatus having the image processing device and a print engine, which techniques make it possible to detect a problem with the external memory and inform a user of the problem.

According to aspects of the present invention, an image processing device is provided, which includes a first processor, a second processor configured to perform communication with the first processor, and a memory connector connected with the second processor, the memory connector being configured such that an external memory is detachably attached thereto, the memory connector comprising a terminal that is connected with the first processor and connectable with a memory area of the external memory which area stores specification information of the external memory. The first processor is configured to, prior to the second processor being booted, determine whether an error relating to the external memory is caused, via the terminal.

According to aspects of the present invention, further provided is an image recording apparatus that includes a print engine configured to form an image on a recording medium, and an image processing device connected with the print engine. The image processing device includes a first processor, a second processor configured to perform communication with the first processor, and a memory connector connected with the second processor, the memory connector being configured such that an external memory is detachably attached thereto, the memory connector comprising a terminal that is connected with the first processor and connectable with a memory area of the external memory which area stores specification information of the external memory. The first processor is configured to, prior to the second processor being booted, determine whether an error relating to the external memory is caused, via the terminal. One of the first processor and the second processor is configured to control the print engine to form the image on the recording medium based on image data stored on the external memory.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

(First Embodiment)

Figure 1:
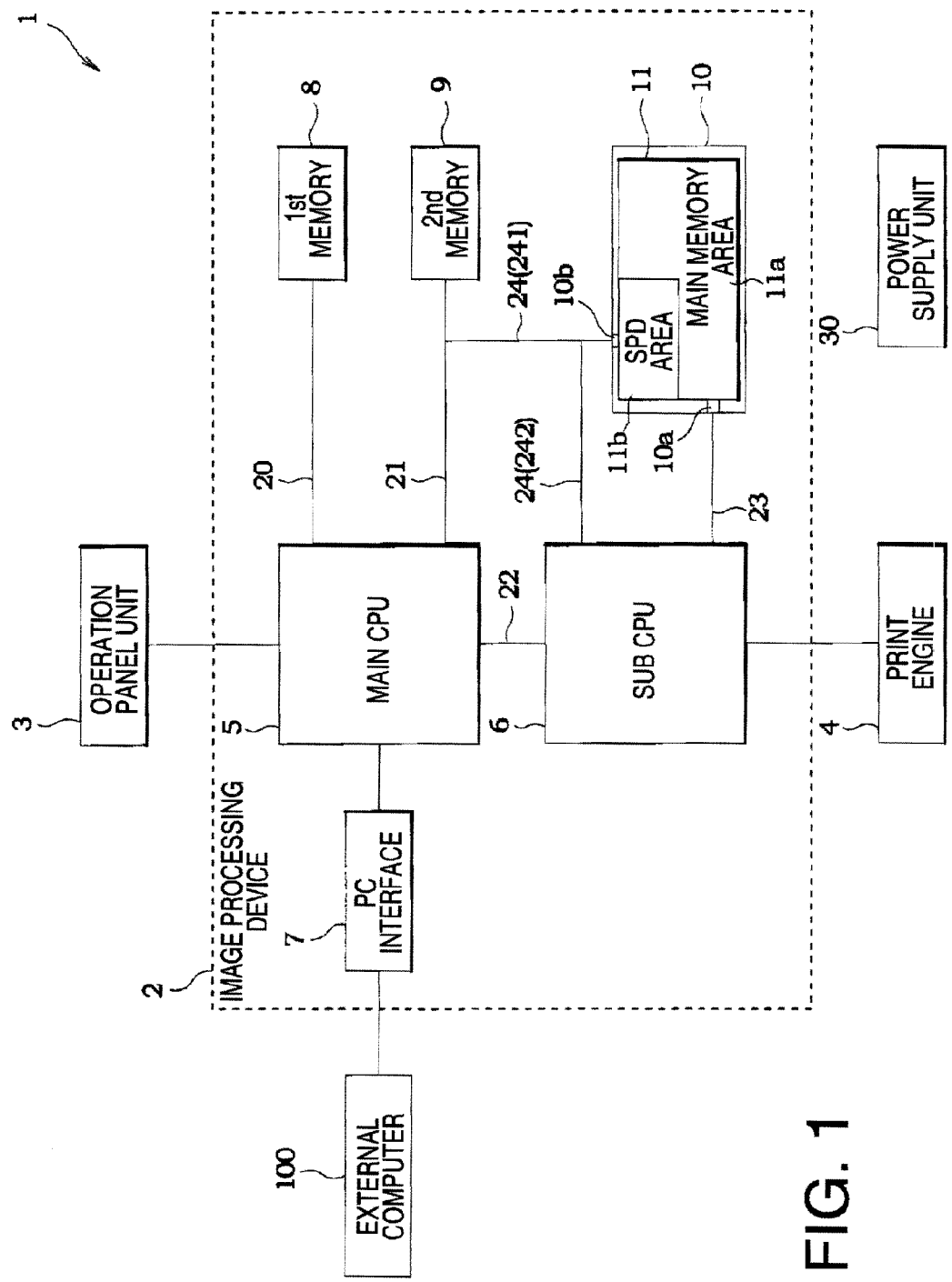
FIG. 1 is a block diagram schematically showing a configuration of a printer in a first embodiment according to one or more aspects of the present invention.

FIG. 1 is a block diagram schematically showing a configuration of a printer 1 in a first embodiment according to aspects of the present invention. As shown in FIG. 1, the printer 1 includes an image processing device 2, an operation panel unit 3 having a display device such as a liquid crystal display (LCD) device, and a print engine 4 having an ink discharge head. Further, the image processing device 2 includes a main CPU (Central Processing Unit) 5, a sub CPU 6, a PC interface 7, on-board memories, i.e., a first memory 8 and a second memory 9, and a memory slot 10 configured such that an external memory 11 is detachably attachable thereto.

The main CPU 5 controls operations of the whole printer 1 that includes the operation panel unit 3 and the print engine 4. In the first embodiment, the main CPU 5 is configured with an ASIC (Application Specific Integrated Circuit). Specifically, the main CPU 5 is configured to be connected with an external computer 100 such as a personal computer via the PC interface 7 to perform data communication therewith. In addition, the main CPU 5 controls the print engine 4 to record (print) an image on a sheet based on print data received from the external computer 100. The print engine 4 may include a recording head for inkjet printing or a laser emitting mechanism and a photoconductive body for laser printing. Further, when a user performs an input operation via the operation panel unit 3, the main CPU 5 receives input signals corresponding to the input operation and controls an operation of each element based on the input signals. Further, the main CPU 5 controls the operation panel unit 3 to display various kinds of information (e.g., setting information, a remaining amount of ink, and error information of the printer 1) that are required to be provided to the user in operations of the printer 1, as needed, with characters and symbols on the LCD device of the operation panel unit 3. Alternatively, in order to display the various kinds of information required to be provided to the user on a display device of the external computer 100 instead of the LCD device of the operation panel unit 3, the main CPU 5 may send signals for displaying the information to the external computer 100.

It is noted that the PC interface 7 may be connected with the external computer 100 via a serial bus such as a USB (Universal Serial Bus), a parallel bus, a wired LAN, or a wireless LAN. Further, the PC interface 7 may be connected with not only the external computer 100 but also a plurality of different external computers 100 via a hub. Further, in the first embodiment, the main CPU 5 controls operations of the print engine 4. However, the sub CPU 6 may control a part or all of the operations of the print engine 4.

Further, the main CPU 5 is connected with the first memory 8 (an on-board memory) via the data bus 20. The first memory 8 is a non-volatile memory such as an MROM (Mask Read Only Memory) and stores basic programs for operating the printer 1, such as programs for driving the operation panel unit 3 and the print engine 4 and a program for performing a below-mentioned error checking process. In addition, the main CPU 5 is connected with the second memory 6 (an on-board memory) via the data bus 21. The second memory 9 is a non-volatile memory such as an EEPROM and stores setting information for the printer 1. In the first embodiment, an I2C (Inter-Integrated Circuit) bus (a serial bus) is employed as the data bus 21 that form a connection between the main CPU 5 and the second memory 9.

It is noted that the main CPU 5 includes an internal memory (not shown). The internal memory is a RAM having a relatively large capacity and includes a load area for temporarily storing the print data received from the external computer 100 while the main CPU 5 is transferring the print data to the sub CPU 6, and a work area to be used when the main CPU 5 executes the programs stored on the first memory 8.

Meanwhile, the sub CPU 6 is configured to convert the print data received from the main CPU 5 via the data bus 22 (employing a USB) into image data and transmit the image data to the print engine 4. Specifically, the sub CPU 6 is connected with the memory slot 10 via a data bus 23, and configured to perform data communication with the external memory 11 attached to the memory slot 10. The sub CPU 6 temporarily stores the print data transferred by the main CPU 5, sequentially reads out and converts the stored print data into the image data, and again stores the image data onto the external memory 11. Then, in response to an instruction from the main CPU 5, the sub CPU 6 sequentially reads out and transmits the image data stored on the external memory 11 to the print engine 4. Thereafter, the print engine 4 discharges ink onto a recording sheet based on the received image data to form an image.

In the first embodiment, a DIMM (Dual Inline Memory Module) that includes an SDRAM forming a main memory area 11a is employed for the external memory 11. The aforementioned print data and image data are stored in the main memory area 11a. Further, the external memory 11 is provided with an EEPROM in addition to the SDRAM. The EEPROM is used as an SPD area 11b for storing an SPD (Serial Presence Detect) that is specification information of the external memory 11. For example, information regarding a capacity, an operating frequency, and operating timing of the external memory 11 is stored as the specification information.

The memory slot 10 includes a terminal 10a configured to be connected with the main memory area 11a of the external memory 11 attached to the memory slot 10, and a terminal 10b configured to be connected with the SPD area 11b of the external memory 11 attached to the memory slot 10. Accordingly, the data bus 23 is connected with the terminal 10a to allow data communication of the print data and the image data between the sub CPU 6 and the main memory area 11a of the external memory 11.

Meanwhile, the terminal 10b, which is configured to be connected with the SPD areas 11b, is connected with the main CPU 5 and the sub CPU 6 via data buses 24 (241 and 242) employing the I2C bus, respectively. Specifically, form the middle of the data bus (I2C bus) 21, which establishes the connection between the main CPU 5 and the second memory 9 as set forth above, the data bus 241 diverges and is connected with the terminal 10b. Further, the different data bus 242 from the data bus 23 establishes the connection between the sub CPU 6 and the terminal 10b. Thus, the specification information of the external memory 11 attached to the memory slot 10 can be read out by each of the main CPU 5 and the sub CPU 6.

The image processing device 2, the operation panel unit 3, and the print engine 4 are supplied with an electrical power from a system power supply (a commercial power supply) via a power supply unit 30 (note: a power supply cable is not shown). The power supply from the power supply unit 30 to each of the image processing device 2, the operation panel unit 3, and the print engine 4 is controlled by the main CPU 5. For instance, the main CPU 5 can individually interrupt the power supply to each of the image processing device 2, the operation panel unit 3, and the print engine 4, and individually reduce the amount of the power supply.

In the meantime, as described above, the memory slot 10 of the printer 1 is configured so that for instance, a user-selected external memory 11 can be attached thereto and exchanged as needed. Therefore, an external memory 11 might be inappropriately attached, an external memory that does not comply with a specification of the sub CPU 6 might be attached, or an external memory 11 having an initial failure might be attached. Hence, in the first embodiment, the printer 1 is configured to, prior to booting the sub CPU 6, cause the main CPU 5 to perform an error checking process for the external memory 11. Hereinafter, the error checking process will be described.

Figure 2:
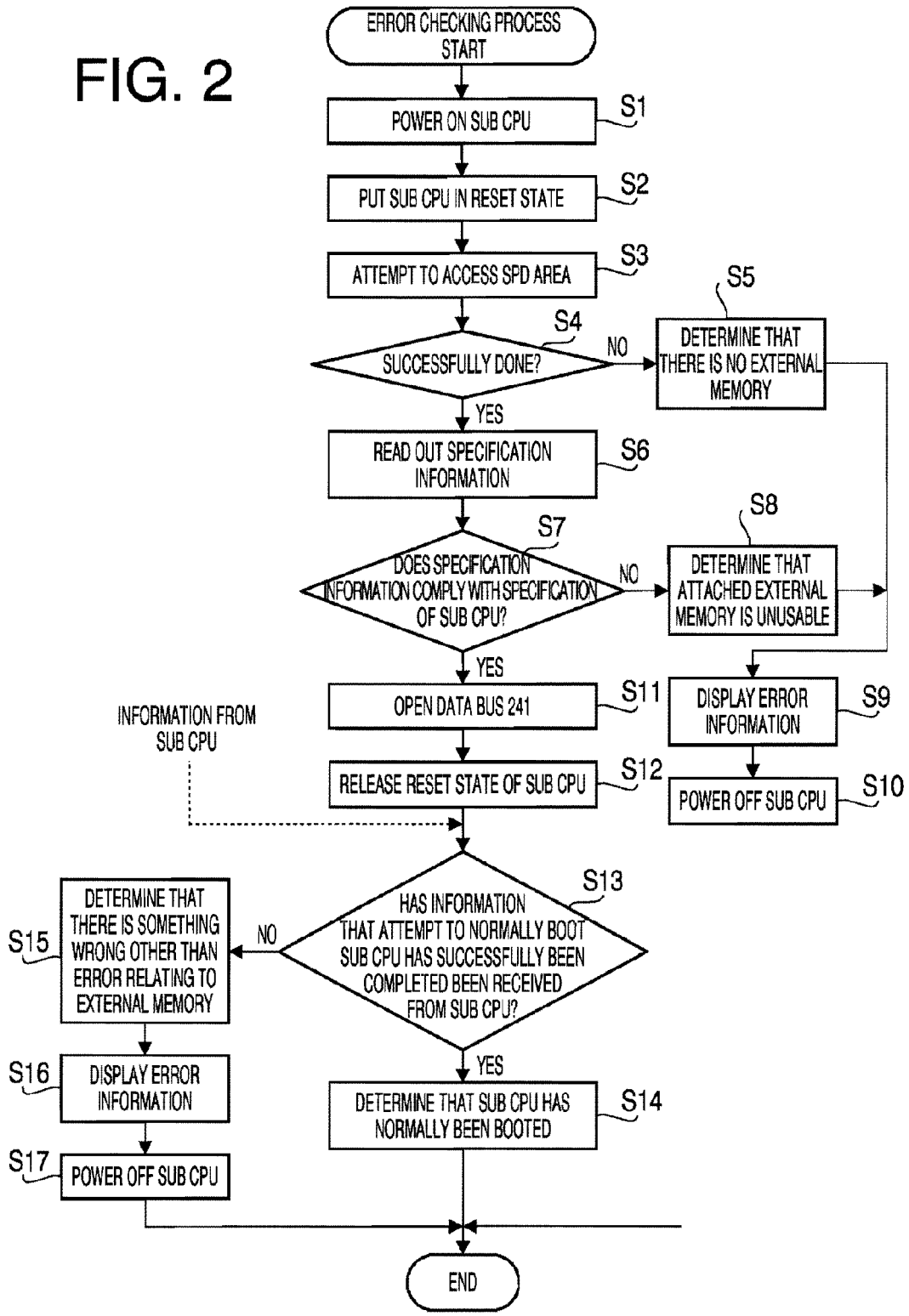
FIG. 2 is a flowchart showing a procedure of an error checking process that a main CPU performs for an external memory in the first embodiment according to one or more aspects of the present invention.

As shown in FIG. 2, in the error checking process, the main CPU 5 turns on the sub CPU 6 with power supply from the power supply unit 30 (S1). At the same time, the main CPU 5 continuously inputs reset signals into the sub CPU 6 to put the sub CPU in a reset state (S2). Then, the main CPU 5 attempts an access to the SPD area 11b of the external memory 11 via the data bus 241 (S3).

When failing in the attempt to access the SPD area 11b (S4: No), the main CPU 5 determines that there is not any external memory 11 attached to the memory slot 10 (or that an external memory 11 is inappropriately attached) (S5). Then, the main CPU 5 displays, on the LCD device of the operation panel unit 3, error information showing that an error is detected (e.g., textual information as "External Memory Error") (S9). Further, the main CPU 5 interrupts the power supply to the sub CPU 6 from the power supply unit 30 to turn off the sub CPU 6 (S10), and thereafter terminates the error checking process.

Thereby, when the external memory 11 is inappropriately attached to the memory slot 10 and therefore the sub CPU 6 cannot normally be booted, it is possible to inform a user that an error relating to the external memory causes the problem that the sub CPU 6 cannot normally be booted. Further, since the power supply to the sub CPU 6 is interrupted, it is possible to save the electric power when the sub CPU 6 cannot normally be booted. In S9 of FIG. 2, the sub CPU 6 is powered off. However, the power supply to the sub CPU 6 needs not necessarily be interrupted completely. The power supply to the sub CPU 6 may be restricted to an amount less than when the sub CPU 6 is normally booted. Further, in addition to restricting the power supply to the sub CPU 6, the main CPU 5 may restrict the amount of the power supply to the print engine 4. Further, the power supply to the main CPU 5 may be restricted to a minimum amount of power supply required for displaying the error information on the operation panel unit 3.

Meanwhile, in S4, when successfully accessing the SPD area 11b of the external memory 11 (S4: Yes), the main CPU 5 reads out the specification information stored in the SPD area 11b (S6). Then, the main CPU 5 compares the read-out specification information with the specification information of the sub CPU 6 stored on the first memory 8 or the second memory 9 to determine whether the read-out specification information complies with the specification of the sub CPU 6 (S7). Consequently, when determining that the read-out specification information does not comply with the specification of the sub CPU 6 (S7: No), the main CPU 5 determines that the external memory 11 attached to the memory slot 10 is unusable (S8). After that, the main CPU 5 executes the aforementioned steps S9 and S10. Namely, the main CPU 5 displays, on the LCD device of the operation panel unit 3, the error information such as "External Memory Error" (S9), turns off the sub CPU 6 (S10), and thereafter terminates the error checking process.

Thereby, even though the external memory 11 is attached to the memory slot 10, when the external memory 11 does not comply with the specification of the sub CPU 6, it is possible to issue the information that the sub CPU 6 cannot normally be booted due to an error relating to the external memory 11. Further, in this case as well, by interrupting (restricting) the power supply to the sub CPU 6, it is possible to save the electric power when the sub CPU 6 cannot normally be booted.

Subsequently, in S7, when determining that the external memory 11 complies with the specification of the sub CPU 6 (S7: Yes), the main CPU 5 opens the data bus 241 between the main CPU 5 and the terminal 10b (S11). It is noted that since the data bus 241 is a bus diverging from the data bus 21, the main CPU 5 substantially opens both the data buses 21 and 241 in S11. Therefore, the sub CPU 6 can use the data bus 242 while the data bus 241 is being opened. Further, after S11, the main CPU 5 stops inputting the reset signals into the sub CPU 6 and releases the reset state of the sub CPU 6 (S12). Thereby, the sub CPU 6 reads out the specification information from the SPD area 11b of the external memory 11 via the data bus 242 and attempts to normally boot the sub CPU 6 itself.

Figure 3:
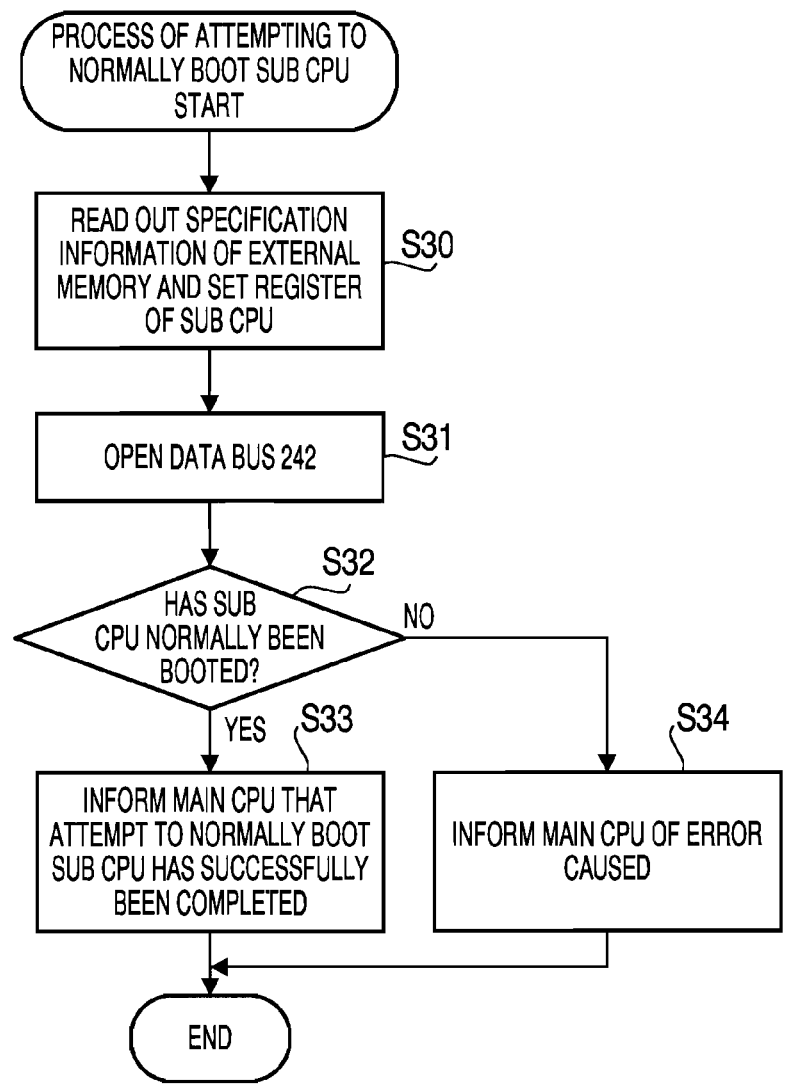
FIG. 3 is a flowchart showing a procedure of a process that a sub CPU performs to attempt to normally boot the sub CPU in the first embodiment according to one or more aspects of the present invention.

FIG. 3 is a flowchart showing a process of attempting to normally boot the sub CPU 6 to be executed immediately after the reset state of the sub CPU 6 is released. As illustrated in FIG. 3, the sub CPU 6 reads out the specification information from the SPD area 11b of the external memory 11 via the data bus 242, and sets a register thereof (e.g., a control register) depending on the specification information (S30). Then, the sub CPU 6 opens the data bus 242 (S31) and determines whether the sub CPU 6 has normally been booted (S32). Consequently, when determining that the sub CPU 6 has normally been booted (S32: Yes), the sub CPU 6 issues, to the main CPU 5, information that the attempt to normally boot the sub CPU 6 has successfully been completed (S33). Thereafter, the sub CPU 6 terminates the present process. Meanwhile, when determining that the sub CPU 6 has not normally been booted (S32: No), the sub CPU 6 issues, to the main CPU 5, information that there is an error caused when the sub CPU 6 attempts to normally boot the sub CPU 6 itself (S34). Thereafter, the sub CPU 6 terminates the present process.

It is noted that when the sub CPU 6 opens the data bus 242 in the aforementioned step S31, the main CPU 5 again comes to be able to use the data buses 21 and 241, so as to freely access the second memory 9.

Referring back to FIG. 2, after releasing the reset state of the sub CPU 6 (S12), the main CPU 5 determines whether the main CPU 5 has received the information that the attempt to normally boot the sub CPU 6 has successfully been completed, from the sub CPU 6 that has finished the attempt (see S33 in FIG. 3). Consequently, when determining that the main CPU 5 has received the information (S13: Yes), the main CPU 5 determines that the sub CPU 6 has normally been booted (S14). Thereafter, the main CPU 5 terminates the error checking process.

Meanwhile, when the main CPU 5 has not received the information that the attempt to normally boot the sub CPU 6 has successfully been completed, namely, the main CPU 5 has received the information that there is an error caused (see S34 in FIG. 3) (S13: No), the main CPU 5 determines that there is something wrong with the sub CPU 6, other than an error relating to the external memory 11 (S15). In this case, the main CPU 5 displays, on the LCD device of the operation panel unit 3, error information representing that an error different from an error relating to the external memory 11 is detected (e.g., textual information "Sub CPU Error") (S16). Then, the main CPU 5 interrupts the power supply to the sub CPU 6 from the power supply unit 30 to turn off the sub CPU 6. Thereafter, the main CPU 5 terminates the error checking process.

Thereby, when the sub CPU 6 cannot normally be booted for a cause having no relation to the external memory 11, it is possible to inform the user that the cause is an error having no relation to the external memory 11. Further, in this case as well, the power supply to the sub CPU 6 is interrupted or restricted. Therefore, it is possible to save the electric power in the case where the sub CPU 6 cannot normally be booted. It is noted that in S17, instead of restricting the power supply to the sub CPU 6, the main CPU 5 may reset the sub CPU 6 and make the sub CPU 6 again perform the process of attempting to normally boot the sub CPU 6 itself (see FIG. 3).

(Second Embodiment)

According to the printer 1 of the first embodiment, in the process of attempting to normally boot the sub CPU 6 (see FIG. 3) to be executed when the attached external memory 11 is determined to be normal, the sub CPU 6 accesses the SPD area 11b of the external memory 11 to read out the specification information (see S30). However, when the sub CPU 6 is not required to set the register thereof depending on the external memory 11, it is possible to omit the operation of reading out the specification information.

Specifically, the register of the sub CPU 6 may previously be set in a fixed manner conforming only to a specific SPD. In this case, when the specification information read out from the external memory 11 (see S6 in FIG. 2) indicates the specific SPD, the main CPU 5 determines that the external memory 11 complies with the specification of the sub CPU 6 (S7: Yes), and releases the reset state of the sub CPU 6 (S12).

Thereby, in the process of attempting to normally boot the sub CPU 6 as shown in FIG. 3, it is possible to omit the operation in S30. Further, the sub CPU 6 needs not read out the specification information of the external memory 11, and therefore, needs not use the data bus 242 to access the SPD area 11b of the external memory 11. Accordingly, since the main CPU 5 needs not open the data bus 241, it is possible to omit the operation in S11 shown in FIG. 2. Along with this, it is possible to omit the step S31 shown in FIG. 3 where the sub CPU 6 opens the data bus 242.

Figure 4:
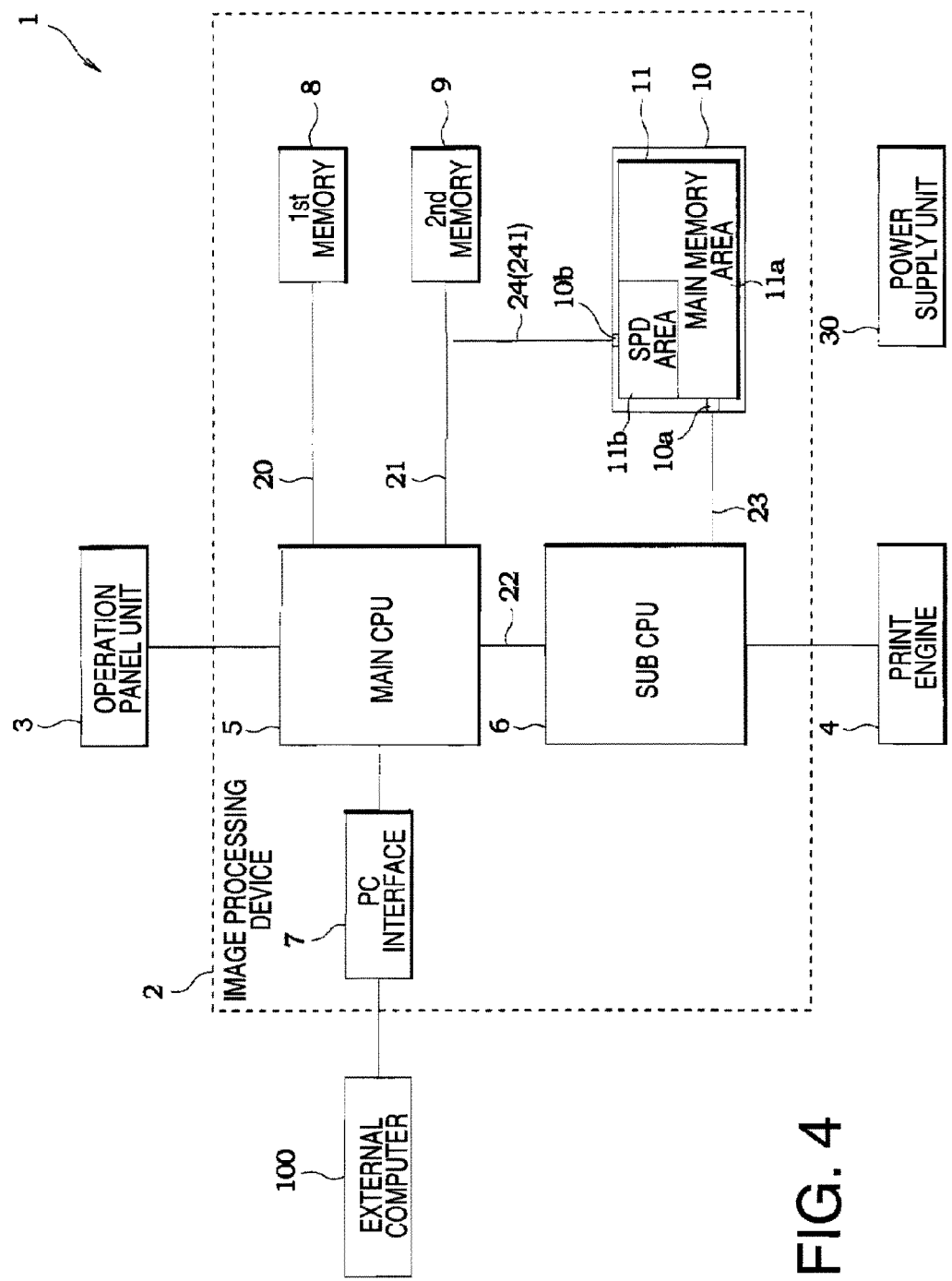
FIG. 4 is a block diagram exemplifying a schematic configuration of a printer in a second embodiment according to aspects of the present invention.

FIG. 4 is a block diagram exemplifying a schematic configuration of a printer 1 of a second embodiment according to aspects of the present invention. The printer 1 shown in FIG. 4 is configured with the data bus 242 being removed from the printer 1 of the first embodiment. In the other aspects, the printer 1 of the second embodiment is configured in the same manner as the printer 1 of the first embodiment. As described above, when the register of the sub CPU 6 is fixedly set, the sub CPU 6 needs not read out the specification information of the external memory 11. Thus, it is possible to omit the data bus between the sub CPU 6 and the terminal 11b, as depicted in FIG. 4.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein.

For example, aspects of the present invention may be applied to a laser printer as well as an inkjet printer.

What is claimed is:

1. An image processing device comprising:
   a first processor;
   a second processor configured to perform communication with the first processor; and
   a memory connector configured such that an external memory is detachably attached thereto, the external memory comprising a main memory area and a specification memory area for storing specification information of the external memory, the memory connector comprising a first terminal connected with the first processor, the first terminal configured to connect with the specification memory area of the external memory when the external memory is attached to the memory connector and a second terminal connected with the second processor, the second terminal configured to connect with the main memory area of the external memory when the external memory is attached to the memory connector, wherein the first processor is configured to, prior to the second processor being booted, determine whether an error relating to the external memory is caused, via the first terminal.

2. The image processing device according to claim 1, further comprising an informing unit that is connected with the first processor and configured to output information,
wherein the first processor is configured to, when determining that an error relating to the external memory is caused, control the informing unit to output information that the error relating to the external memory is detected.

3. The image processing device according to claim 1, further comprising a power supply unit configured to supply an electric power to the second processor,
wherein the first processor is configured to, when determining that an error relating to the external memory is caused, restrict electric power supply to the second processor from the power supply unit.

4. The image processing device according to claim 1,
wherein the second processor is configured to be normally booted when the external memory attached to the memory connector has a predetermined specification information,
wherein the first processor is configured to determine whether the external memory attached to the memory connector has the predetermined specification information in the specification memory area,
wherein the first processor is further configured to, when determining that the external memory attached to the memory connector has the predetermined specification information, send to the second processor an instruction for booting the second processor, and
wherein the second processor is further configured to, when receiving the instruction from the first processor, attempt to boot the second processor based on the predetermined specification information.

5. The image processing device according to claim 1,
wherein the second processor is configured to, when the first processor determines that an error relating to the external memory is not caused, read out the specification information via the second terminal and attempt to boot the second processor based on the specification information.

6. An image recording apparatus comprising:
a print engine configured to form an image on a recording medium; and
an image processing device connected with the print engine, the image processing device comprising:
a first processor;
a second processor configured to perform communication with the first processor; and
a memory connector configured such that an external memory is detachably attached thereto, the external memory comprising a main memory area and a specification memory area for storing specification information of the external memory, the memory connector comprising a first terminal connected with the first processor, the first terminal configured to connect with the specification memory area of the external memory when the external memory is attached to the memory connector and a second terminal connected with the second processor, the second terminal configured to connect with the main memory area of the external memory when the external memory is attached to the memory connector,
wherein the first processor is configured to, prior to the second processor being booted, determine whether an error relating to the external memory is caused, via the first terminal, and
wherein one of the first processor and the second processor is configured to control the print engine to form the image on the recording medium based on image data stored on the external memory.

7. The image recording apparatus according to claim 6, further comprising an informing unit that is connected with the first processor and configured to output information,
wherein the first processor is configured to, when determining that an error relating to the external memory is caused, control the informing unit to output information that the error relating to the external memory is detected.

8. The image recording apparatus according to claim 6, further comprising a power supply unit configured to supply an electric power to the second processor,
wherein the first processor is configured to, when determining that an error relating to the external memory is caused, restrict electric power supply to the second processor from the power supply unit.

9. The image recording apparatus according to claim 6,
wherein the second processor is configured to be normally booted when the external memory attached to the memory connector has a predetermined specification information,
wherein the first processor is configured to determine whether the external memory attached to the memory connector has the predetermined specification information in the specification memory area,
wherein the first processor is further configured to, when determining that the external memory attached to the memory connector has the predetermined specification information, send to the second processor an instruction for booting the second processor, and
wherein the second processor is further configured to, when receiving the instruction from the first processor, attempt to boot the second processor based on the predetermined specification information.

10. The image recording apparatus according to claim 6,
wherein the second processor is configured to, when the first processor determines that an error relating to the external memory is not caused, read out the specification information via the second terminal and attempt to boot the second processor based on the specification information.

11. The image recording apparatus according to claim 6,
wherein the second processor receives print data via the communication with the first processor, and processes the received print data to create the image data.

12. An image processing device comprising:
a first processor;
a second processor configured to perform communication with the first processor; and
a memory connector configured such that an external memory is detachably attached thereto, the external memory comprising a specification memory area for storing specification information of the external memory, the memory connector comprising a terminal connected with the first processor, the terminal configured to connect with the specification memory area of the external memory when the external memory is attached to the memory connector, wherein when the external memory is attached to the memory connector, the first processor is configured to attempt to access the specification memory area, and wherein when the first processor fails in the attempt to access the specification memory area, the first processor determines that an error has occurred.

* * * * *